United States Patent
Fang et al.

(10) Patent No.: US 7,970,973 B2
(45) Date of Patent: Jun. 28, 2011

(54) PORTABLE DEVICE HAVING PLUG DETECTOR AND CONTROL METHOD OF DETECTING THE PORTABLE DEVICE

(75) Inventors: Wen-Jeng Fang, Taipei (TW); Tsang-Yi Chen, Taipei County (TW); Chung-Won Shu, Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 0 days.

(21) Appl. No.: 12/626,939

(22) Filed: Nov. 30, 2009

(65) Prior Publication Data

US 2011/0113174 A1 May 12, 2011

(30) Foreign Application Priority Data

Nov. 6, 2009 (TW) ................................ 98137683 A (51) Int. Cl.
*H05K 7/10* (2006.01)
(52) U.S. Cl. ........ 710/301; 710/302; 439/173; 439/188; 439/489
(58) Field of Classification Search .................. 710/301, 710/302; 200/51–52; 439/173, 188, 489
See application file for complete search history.

(56) References Cited

U.S. PATENT DOCUMENTS

| | | | | |
|---|---|---|---|---|
| 5,463,261 A | * | 10/1995 | Skarda et al. ................. | 307/131 |
| 5,513,999 A | * | 5/1996 | Fry et al. ....................... | 439/188 |
| 5,644,731 A | * | 7/1997 | Liencres et al. ............... | 710/302 |
| 5,674,085 A | * | 10/1997 | Davis et al. ................... | 439/188 |
| 5,675,813 A | * | 10/1997 | Holmdahl ...................... | 713/310 |
| 5,691,898 A | * | 11/1997 | Rosenberg et al. ............. | 700/85 |
| 5,907,487 A | * | 5/1999 | Rosenberg et al. ............. | 700/85 |
| 5,929,607 A | * | 7/1999 | Rosenberg et al. ........... | 320/166 |
| 6,162,078 A | * | 12/2000 | Chung .......................... | 439/188 |
| 6,281,457 B1 | * | 8/2001 | Chang .......................... | 200/547 |
| 7,160,125 B1 | * | 1/2007 | Teicher ......................... | 439/173 |
| 7,627,128 B2 | * | 12/2009 | Sander et al. ................... | 381/74 |
| 7,635,280 B1 | * | 12/2009 | Crumlin et al. ............... | 439/489 |
| 7,791,319 B2 | * | 9/2010 | Veselic et al. ................. | 320/158 |
| 2003/0085108 A1 | * | 5/2003 | Chiang et al. ............. | 200/51.09 |

FOREIGN PATENT DOCUMENTS

| TW | 453111 | 9/2001 |
|---|---|---|
| TW | M256012 | 1/2005 |

OTHER PUBLICATIONS

Compaq et al. Universal Serial Bus Specification. Revision 2.0. Apr. 27, 2000.*
Intel Corporation. Universal Host Controller Interface (UHCI). Design Guide. Revision 1.1. Mar. 1996.*
Intel Corporation. Enhanced Host Controller Interface Specification for Universal Serial Bus. Revision 1.0. Mar. 12, 2002.*
USB Implementers Forum, Inc. USB 'A' Plug Form Factor. Revision 1.0. Mar. 23, 2005.*

* cited by examiner

*Primary Examiner* — Matthew D Spittle
(74) *Attorney, Agent, or Firm* — Winston Hsu; Scott Margo (57) ABSTRACT

A reciprocating plug detector is configured at the connector of a portable device and is pushed to generate a control signal when the portable device is plugged into a host system. A controller of the portable device then performs a command when receiving the control signal. When the portable device is unplugged from the host system, the reciprocating plug detector may also be used for generating the control signal and before the portable device totally leaves the host system, the controller performs other pre-defined command during these few milliseconds. The portable device is implemented with a variety of computer controllability and provided with power-failure protection for data.

13 Claims, 7 Drawing Sheets

PORTABLE DEVICE HAVING PLUG DETECTOR AND CONTROL METHOD OF DETECTING THE PORTABLE DEVICE

BACKGROUND OF THE INVENTION

1. Field of the Invention

The invention relates to a portable device and a system control method, and more particularly, to a portable device having a plug/unplug detector that is capable of performing a pre-defined command when the detector is actuated and a control method for performing command according to plug/unplug of the portable device.

2. Description of the Prior Art

Portable devices are commonly used to transmit and store data with a host system when plugging into the host system such as a personal computer. Taking universal serial bus (USB) storage device as an example, its hot-plug feature for the host system endows the device with extensive aspect of applications. Most host systems have specific device removal procedure for terminating all the upcoming memory access to ensure the external storage device is removed from the host system in a safe and stable way. In many situations, however, the USB storage device may be removed from the host system incautiously, whether deliberately or unintentionally. Such sudden removal of the portable device may cause immeasurable data lost or damage if transmitting is still on between the device and the host system as the removal occurs. More serious consequences may be that some critical files of the host system or the USB storage device are destroyed, leading to the unhappy result that the host system or the portable device is no longer operatible.

SUMMARY OF THE INVENTION

The embodiments of the invention disclose a portable device having plug detector. The portable device is used for electrically connecting to a first connector of a host system along a first direction and exchanging data with the host system where the first connector comprises an actuator. The portable device includes a second connector for plugging into the first connector such that the portable device is electrically connected to the host system, a reciprocating plug detector configured at the second connector for being actuated by the actuator to generate a control signal, and a controller electrically connected to the reciprocating plug detector for performing a command when receiving the control signal generated by the reciprocating plug detector. The portable device is a universal serial bus (USB) device and the first connector is an USB female plug.

The embodiments of the invention also disclose a method for performing command when detecting a portable device plugging/unplugging into a host system. The portable device is used for electrically connecting to a first connector of the host system along a first direction and exchanging data with the host system where the first connector comprises an actuator. The method includes steps: when a second connector of the portable device plugs/unplugs into the first connector of the host system along the first direction, a reciprocating plug detector of the portable device being actuated by the actuator to generate a control signal; and a controller of the portable device performing a command when receiving the control signal generated by the reciprocating plug detector. The portable device is a universal serial bus (USB) device and the first connector is an USB female plug.

These and other objectives of the present invention will no doubt become obvious to those of ordinary skill in the art after reading the following detailed description of the preferred embodiment that is illustrated in the various figures and drawings.

DETAILED DESCRIPTION

The invention implements a reciprocating plug detector at the side or inside the connector of a portable device, which the reciprocating plug detector is capable of detecting plugging or unplugging of the portable device, so that the controller of the portable device may be noted with the plugging/unplugging movement and make corresponding reaction.

Figure 1:
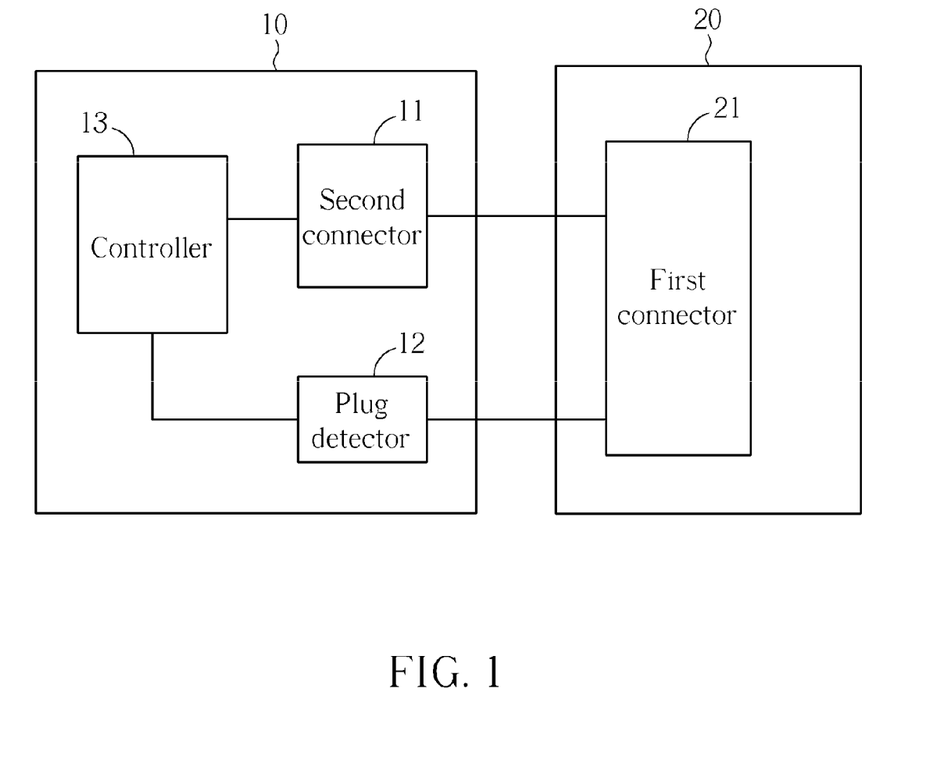
FIG. 1 is a schematic diagram of a first embodiment of a portable device electrically connecting to a host system.

Please refer to FIG. 1, which is a schematic diagram of a first exemplary embodiment of a portable device 10 electrically connecting to a host system 20. The portable device 10 may be storage device, peripheral devices, portable disk, or MP3 players that are equipped with hot-plug capability by using interfaces such as the universal serial bus (USB) or the IEEE 1394 interfaces. The portable device 10 includes at least a second connector 11, a reciprocating plug detector 12, and a controller 13. Both the second connector 11 and the reciprocating plug detector 12 are electrically connected to the controller 13. The host system 20 may be personal computers, workstations, notebook computers, or any portable devices equipped with expansion connecting ports. The host system 20 includes at least a first connector 21. The portable device 10 is electrically connected to the first connector 21 of the host system 20 through the second connector 11, whereas the first connector 21 and the second connector 11 may be USB A type (or B Type) connectors, IEEE 1394 connectors, or any male-to-female connectors used for common portable devices. As the portable device 10 plugs into the host system 20 for exchanging data, via the second connector 11 electrically connecting to the first connector 21, the first connector 21 of the host system 20 mechanically actuates the reciprocating plug detector 12 of the portable device 10 such that an additional control signal is generated and used for doing various tasks as required by design of the portable device 10.

Figure 2:
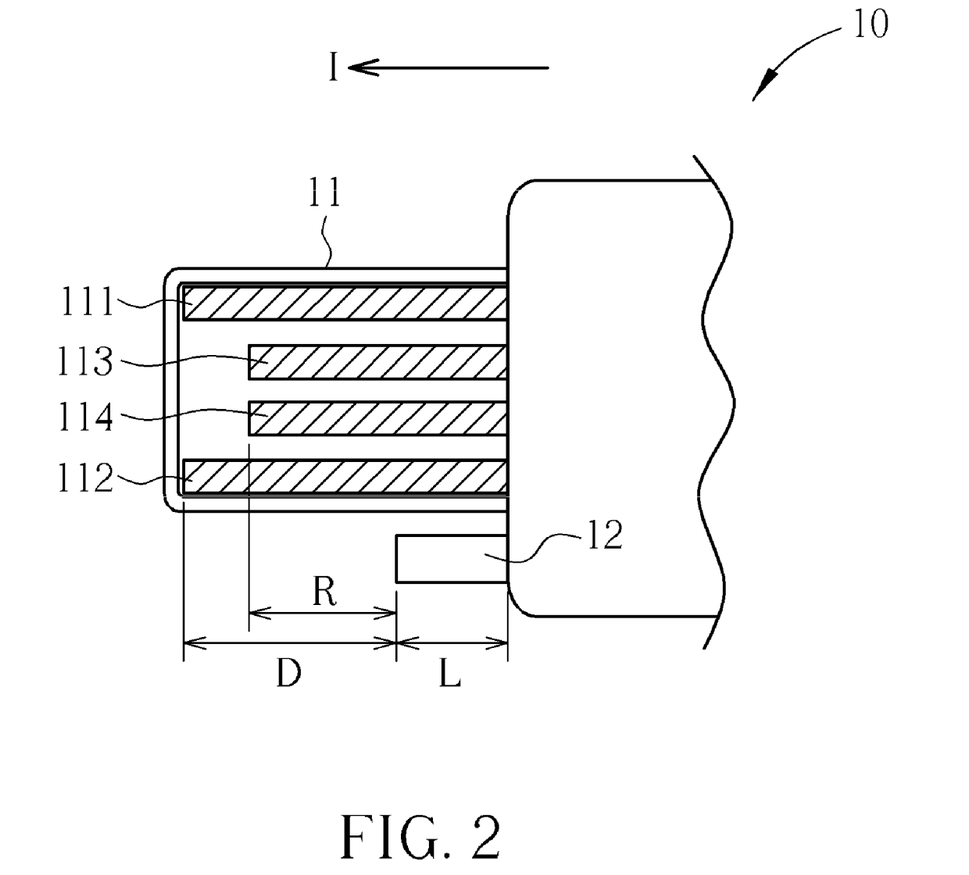
FIG. 2 is a schematic diagram of a second connector together with a reciprocating plug detector of the portable device.
Figure 3:
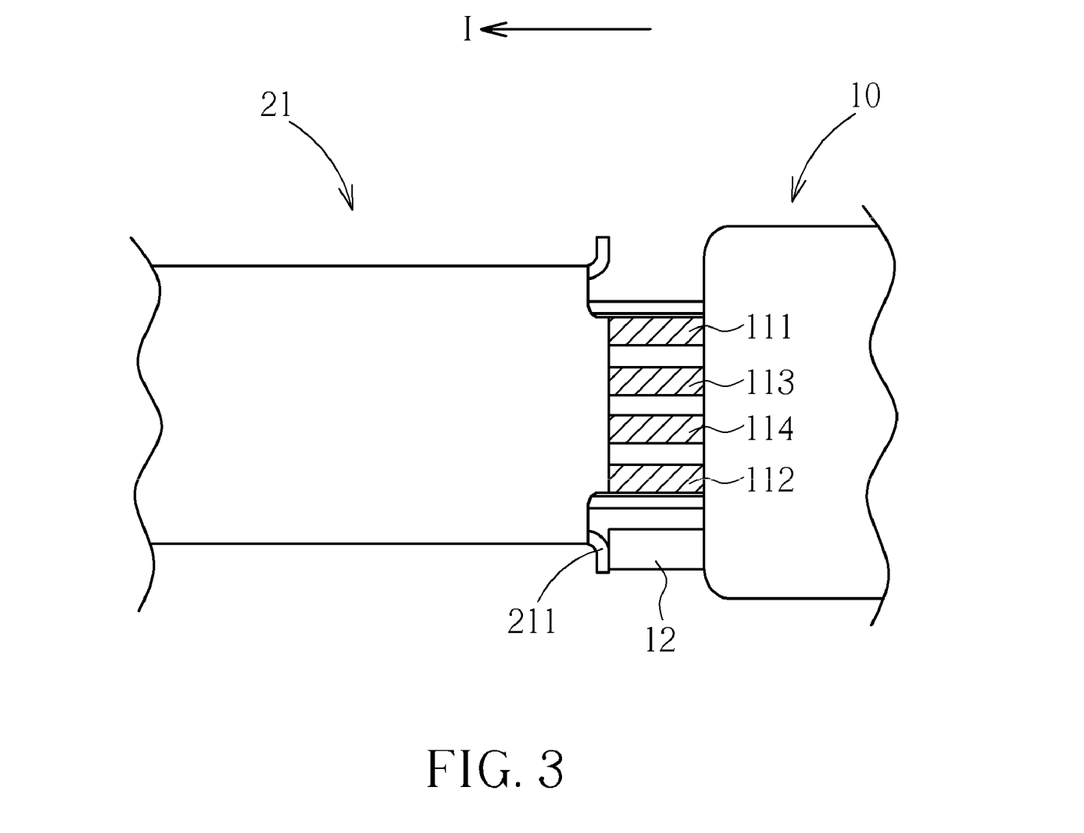
FIG. 3 is a schematic diagram showing the portable device connecting to the first connector of the host system.

FIG. 2 shows a schematic diagram of the second connector 11 together with the reciprocating plug detector 12 of the portable device 10. The second connector 11 in this embodiment is exemplified and illustrated as an USB A Type male connector, which includes a power pin 111, a ground pin 112, and data pins (including a D+ pin 113 and a D− pin 114) and all the pins are deployed and functioning according to the USB standard. The reciprocating plug detector 12 is configured at the side of the second connector 11 in this embodiment. Please also refer to FIG. 3, which is a schematic diagram showing the portable device 10 connecting to the first connector 21 of the host system 20. In this embodiment, the reciprocating plug detector 12 is a reciprocating resilient button; while in other embodiments, the reciprocating plug detector 12 may also be the circular housing of the portable device 10. As the portable device 10 plugs into the first connector 21 of the host system 20 along direction I, the power pin 111, the ground pin 112, the D+ ping 113, and the D− pin 114 electrically connect the corresponding pins (not shown in the figure) of the first connector 21 respectively and connection between the portable device 10 and the host system 20 is then established. During the connection's establishment, an actuator 211, which may be a protrusion of the first connector 21 or portion of the housing of the host system 20, of the first connector 21 contacts and actuates the reciprocating plug detector 12 and the reciprocating plug detector 12 generates a control signal accordingly.

Figure 4:
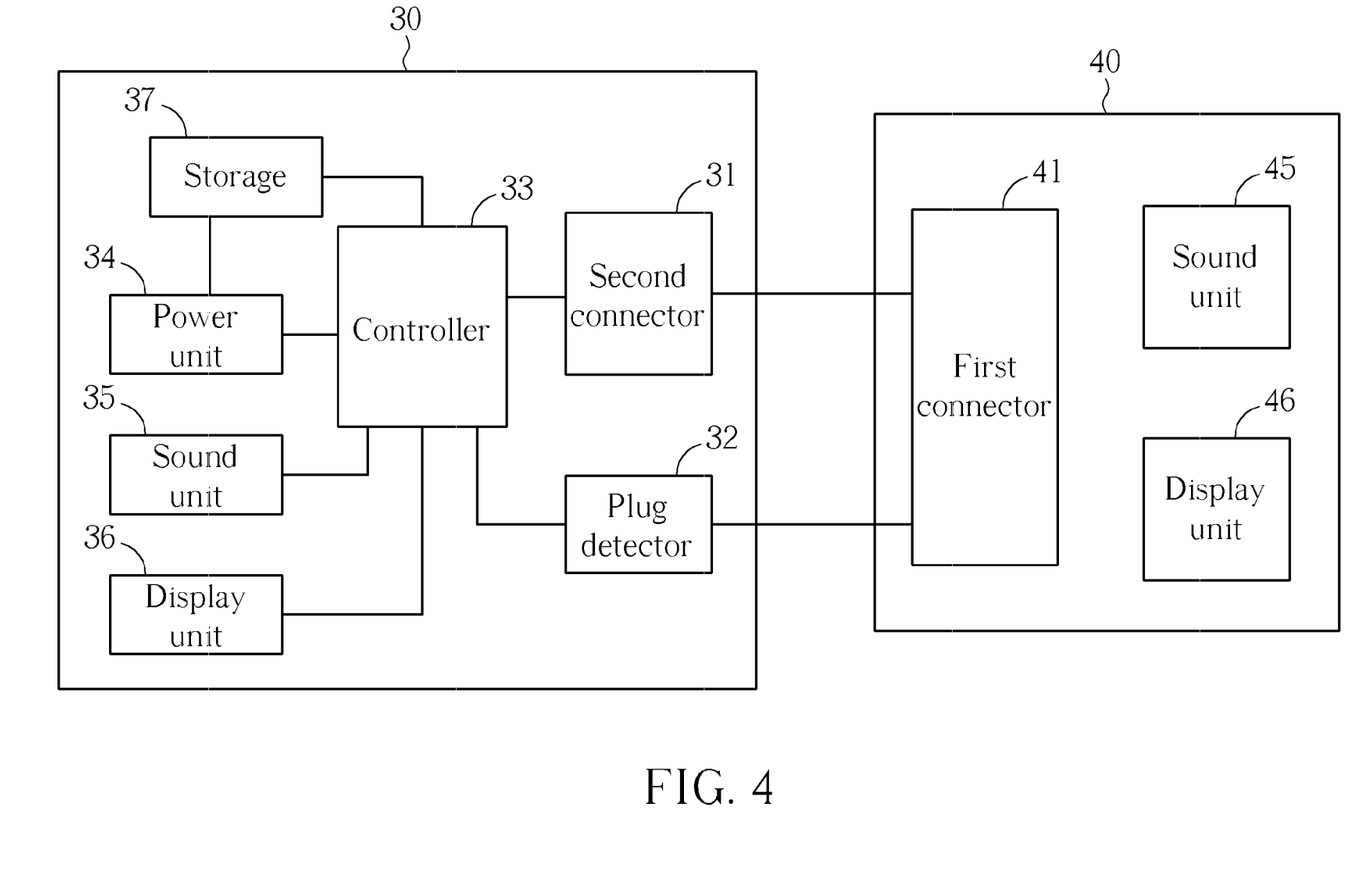
FIG. 4 is a block diagram of a second embodiment of the portable device connecting to the host system.

Please refer to FIG. 4, which is a block diagram of a second exemplary embodiment of a portable device 30 connecting to a host system 40. In addition to a second connector 31, a reciprocating plug detector 32, and a controller 33, the portable device 30 may further optionally include a power unit 34, a sound unit 35, a display unit 36, and a storage 37. The power unit 34 may be internal power supply of the portable device 30, such as a rechargeable battery or solar battery, or an external power module. In addition to a first connector 41, the host system 40 may further optionally include a sound unit 45 and a display unit 46. In this embodiment, the second connector 31 and the reciprocating plug detector 32 have connection with the first connector 41 substantially in the same manner as the first embodiment in FIG. 1.

Please refer to both the portable device 10 in FIG. 2 and the portable device 30 in FIG. 4. To set up a data protection mechanism for the portable devices 10, 30, or to enable the portable devices 10, 30 with various computer controllability by making use of the plugging/unplugging between the portable devices 10, 30 and the host systems 20, 40, the reciprocating plug detectors 12, 32 are configured at the side of the second connectors 11, 31 along the direction I for no less than the distance defined by a connector standard. For example, as an USB male connector plugs an USB female connector, the minimum distance between the gap of both the connectors defined by USB standard is 2.67 mm; hence the reciprocating plug detectors 12, 32 extend at the side of the second connectors 11, 31 along the direction I with length L no less than 2.67 mm, or preferably some larger than 2.67 mm. Since the reciprocating plug detectors 12, 32 are preferably a pushable reciprocating button, the actuator 211 of the first connectors 21, 41 may contact and push the reciprocating plug detectors 12, 32 so that the reciprocating plug detectors generate a control signal accordingly as the second connectors 11, 31 plug into the first connectors 21, 41 along the direction I. When the portable devices 10, 30 are at the phase of plugging into the host systems 20, 40, the controllers 13, 33 are used to receive the control signal, which may be realized as a general purpose I/O (GPIO) signal, and then perform a pre-defined command. For example, the supply of power for the portable devices 10, 30 may be switched from the power unit 34 inside the portable devices 10, 30 to the host systems 20, 40, where the power from the host systems 20, 40 is transmitted to the portable devices 10, 30 through the power pin 111 and the ground pin 112. The power of the power unit 34 of the portable devices 10, 30 may be saved.

One embodiment of the invention shows an application according to above description, while in other embodiments, the reciprocating plug detectors 12, 32 may generate the control signal when not pushed by the actuator 211 anymore.

For example, as the second connectors 11, 31 unplug from the first connectors 21, 41 of the host systems 20, 40 along the reverse of direction I, the actuator 211 of the first connectors 21, 41 will stop pushing the reciprocating plug detectors 12, 32, which will restore to an unpushed state as shown in FIG. 2 since the reciprocating plug detectors 12, 32 are preferably a reciprocating button. As the power pin 111, the ground pin 112, and the D+ pin 113 and the D− pin 114 are longer than the reciprocating plug detector 12, 32 along the direction I, few milliseconds of interval, which starts when the reciprocating plug detectors 12, 32 generate the control signal and ends when the portable devices 10, 30 electrically disconnect from the host systems 20, 40 (or in other words, the second connectors 11, 31 completely leave the first connectors 21, 41), or the interval ends when the portable devices 10, 30 stop the data exchanging with the host systems 20, 40 (or in other words, the data pins of the first connectors 21, 41 and the second connectors 11, 31 disconnect), allows the controllers 13, 33 to perform a pre-defined command once the control signal is received. Preferably, the distance D between the end of the reciprocating plug detectors 12, 32 and the ends of the power pin 111 and the ground pin 112 satisfies the minimum distance requirement defined by USB standard, i.e., D is at least no less than 4.2 mm; the distance R between the end of the reciprocating plug detectors 12, 32 and the ends of the D+ pin 113 and the D− pin 114 satisfies the minimum distance requirement defined by USB standard, i.e., R is at least no less than 3.2 mm. At such phase, the command performed by the controllers 13, 33 may be (1) terminating a background program of the portable devices 10, 30 with a standard system interruption, which prevents data crash due to sudden disconnection between the portable devices 10, 30 and the host systems 20, 40; (2) activating the power unit 34 to supply power to the portable devices 10, 30 and taking over the currently ongoing process of the portable devices 10, 30; (3) commanding the host systems 20, 40 to shutdown or performing other specific notification or control; for example, the portable devices 10, 30 may utilize the technique disclosed in the invention to serve as an operation check tool for the host systems 20, 40. The host systems 20, 40 are operatible only when the portable devices 10, 30 are plugging therein and will be shutdown (by the portable devices 10, 30 sending a forced shutdown command to the host systems 20, 40) once the portable devices 10, 30 are unplugged from the host systems 20, 40; (4) commanding the sound units 35, 45 of the portable devices 10, 30 or of the host systems 20, 40 to generate sounds or commanding the display units 36, 46 of the portable devices 10, 30 or of the host systems 20, 40 to display, notifying the user that the portable devices 10, 30 are now safe to remove from the host systems 20, 40.

Figure 5:
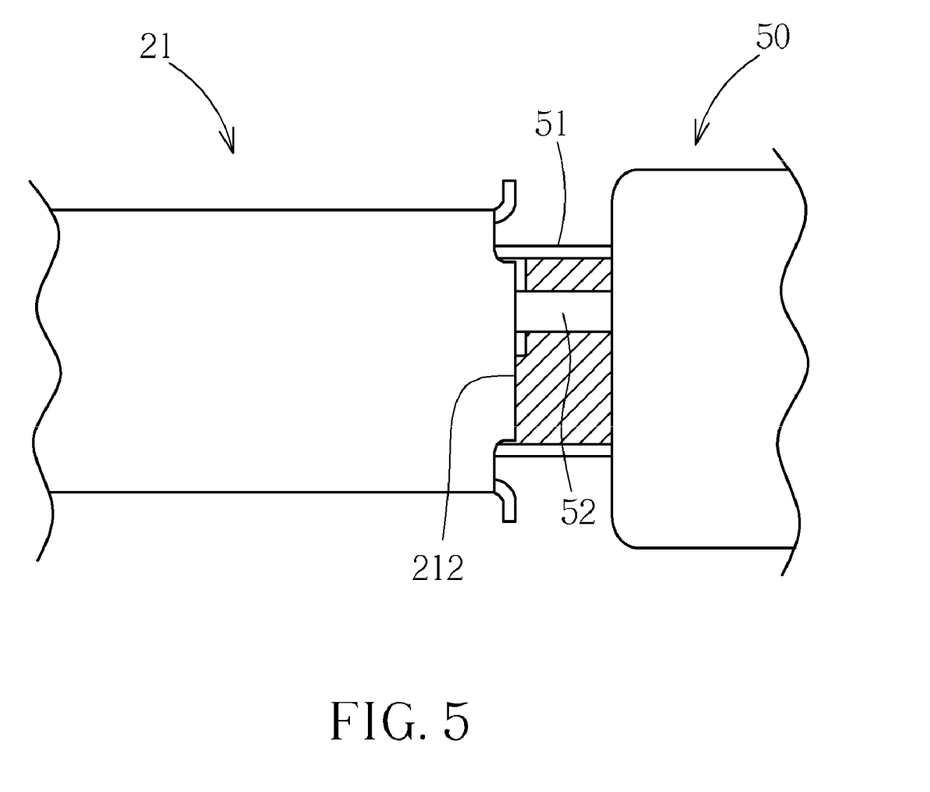
FIG. 5 is a schematic diagram showing partial of a third embodiment of the portable device connecting to the host system.

Additionally, FIG. 5 shows that a reciprocating plug detector 52 of a portable device 50 may also be configured inside a second connector 51 and be actuated, pushed or unpushed, by the actuator 212 (the front end of the first connector 21) to generate the control signal, when the second connector 51 is plugging into the first connector 21. Furthermore, by using GPIO wiring to send the control signal to the controllers 13, 33, the invention has no need to largely change the inner circuitry of the device.

Figure 6:
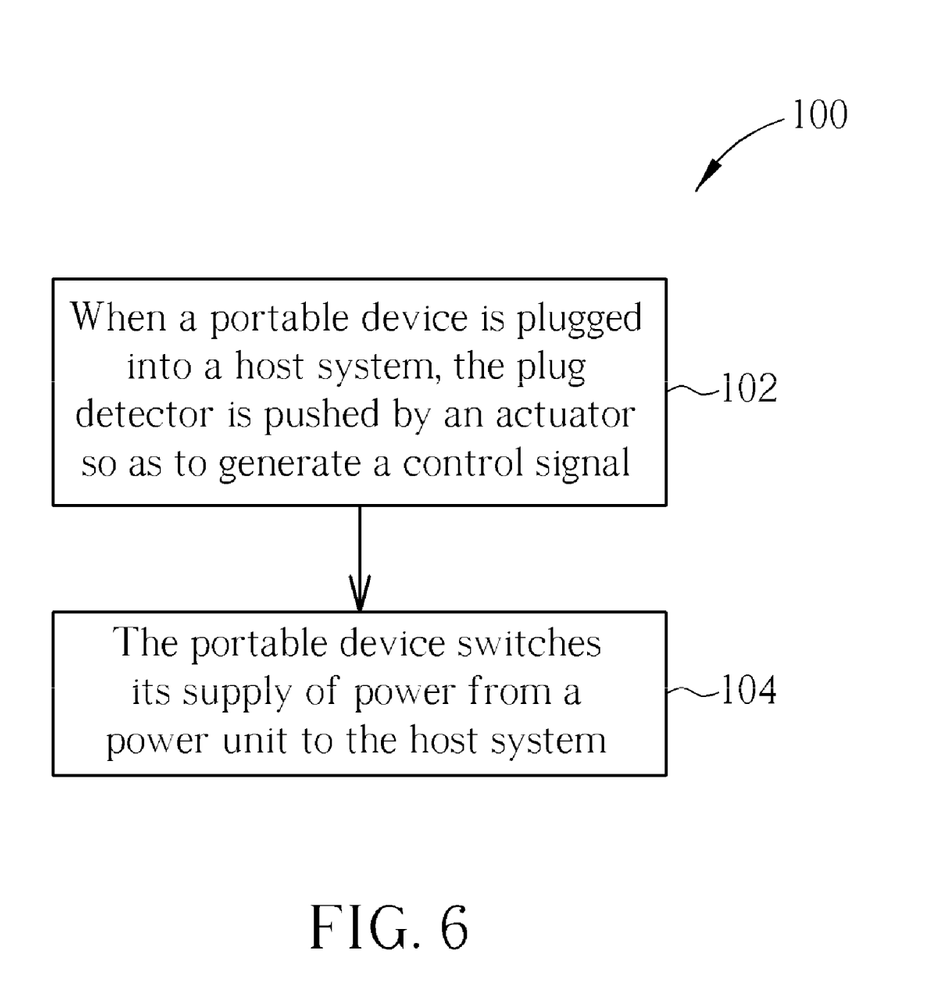
FIG. 6 is a flow chart of a method performing a command when the portable device plugs into the host system.

Please refer to FIG. 6, which shows a flow chart of a method 100 performing a command when the portable device 30 plugs into the host system 40. The method 100 includes following steps:

Step 102: when the portable device 30 plugs into the host system 40, the reciprocating plug detector 32 is pushed by the actuators 211, 212 so as to generate the control signal;

Step 104: the portable device 30 switches its supply of power from the power unit 34 to the host system 40.

In other words, when the portable device 30 plugs into the host system 40, the portable device 30 is powered by the host system 40, further saving the power of the power unit 34 built in the portable device 30. The power life of the power unit 34 may be extended.

Figure 7:
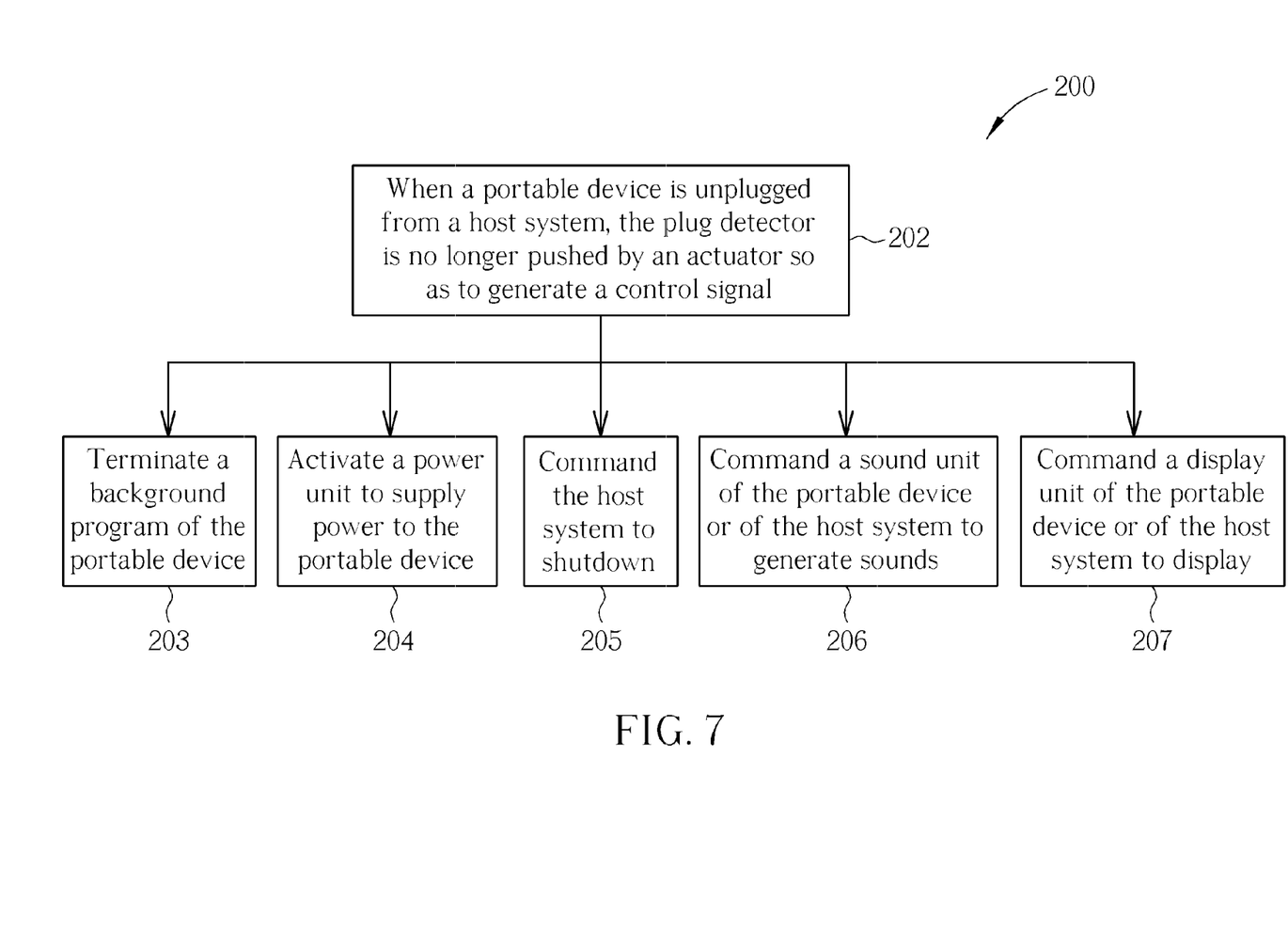
FIG. 7 is a flow chart of a method performing a command when the portable device unplugs from the host system.

Please refer to FIG. 7, which shows a flow chart of a method 200 performing a command when the portable device 30 unplugs from the host system 40. The method 200 includes following steps:

Step 202: when the portable device 30 is unplugged from the host system 40, the reciprocating plug detector 32 is no longer pushed by the actuators 211, 212 and generate the control signal accordingly;

As the controller 33 of the portable device 30 receives the control signal generated by the reciprocating plug detector 32, it performs a command according to various needs. For example:

Step 203: terminate a background program of the portable device 30;

Step 204: activate the power unit 34 to supply power to the portable device 30;

Step 205: command the host system 40 to shutdown;

Step 206: command the sound units 35, 45 of the portable device 30 or of the host system 40 to generate sounds;

Step 207: command the display units 36, 46 of the portable device 30 or of the host system 40 to display.

The portable device disclosed in the invention uses a reciprocating plug detector configured at the connector of the portable device for performing a pre-defined command. The reciprocating plug detector may be pushed to generate the control signal when the portable device is plugged into the host system. A controller of the portable device then performs a command when receiving the control signal. When the portable device is unplugged from the host system, the reciprocating plug detector may also be used for generating the control signal and before the portable device totally leaves the host system, the controller performs other pre-defined command during these few milliseconds. The portable device is implemented with a variety of computer controllability and provided with power-failure protection for data.

Those skilled in the art will readily observe that numerous modifications and alterations of the device and method may be made while retaining the teachings of the invention.

What is claimed is:

1. A portable device having plug detector, the portable device being used for electrically connecting to a first connector of a host system where the first connector comprises an actuator, the portable device comprising:

a second connector for plugging into the first connector such that the portable device is electrically connected to the host system, the second connector comprising a data pin;

a reciprocating plug detector configured at the second connector for being pushed by the actuator and for generating a control signal when the actuator stops pushing the reciprocating detector, the reciprocating plug detector distancing the data pin along a first direction from no less than 3.2 mm; and a controller electrically connected to the reciprocating plug detector for performing a command when receiving the control signal generated by the reciprocating plug detector.

2. The portable device of claim 1, wherein the actuator is either a protrusion of the first connector or the housing of the host system.

3. The portable device of claim 1, wherein the second connector comprises a power pin and a ground pin, and the reciprocating plug detector distances the power pin and the ground pin along the first direction from no less than the distance defined by USB standard.

4. The portable device of claim 3, wherein the reciprocating plug detector distances the power pin and the ground pin along the first direction from no less than 4.2 mm.

5. The portable device of claim 1, wherein the reciprocating plug detector distances the data pin along the first direction from no less than the distance defined by USB standard.

6. The portable device of claim 1, wherein the reciprocating plug detector generates the control signal when pushed by the actuator.

7. The portable device of claim 6, further comprising a power unit wherein the command is switching the supply of power for the portable device from the power unit to the host system.

8. The portable device of claim 1, wherein the command comprises at least one of the following commands: terminating a background program of the portable device, activating a power unit to supply power to the portable device, commanding the host system to shutdown, commanding a sound unit of the portable device or of the host system to generate sounds, and commanding a display unit of the portable device or of the host system to display.

9. The portable device of claim 1, wherein the control signal is a general purpose I/O (GPIO) signal.

10. The portable device of claim 1, wherein the reciprocating plug detector is either a button or a circular housing of the portable device.

11. The portable device of claim 1, wherein the reciprocating plug detector extends at the side of the second connector with length along the first direction no less than the distance defined by USB standard.

12. The portable device of claim 11, wherein the reciprocating plug detector extends at the side of the second connector with length along the first direction no less than 2.67 mm.

13. The portable device of claim 1, wherein the actuator is the housing of a USB female plug.

* * * * *